(12) United States Patent
Lowe et al.

(10) Patent No.: US 11,170,791 B2
(45) Date of Patent: *Nov. 9, 2021

(54) SYSTEMS AND METHODS FOR IMPLEMENTING EFFICIENT CROSS-FADING BETWEEN COMPRESSED AUDIO STREAMS

(71) Applicant: Sirius XM Radio Inc., New York, NY (US)

(72) Inventors: Raymond Lowe, Chester, NJ (US); Mark Kalman, Tappan, NY (US); Deepen Sinha, Chatham, NJ (US); Christopher Ward, Lawrenceville, NJ (US)

(73) Assignee: Sirius XM Radio Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,296

(22) Filed: Jul. 30, 2019

(65) Prior Publication Data

US 2020/0202871 A1 Jun. 25, 2020

Related U.S. Application Data

(63) Continuation of application No. 15/722,240, filed on Oct. 2, 2017, now Pat. No. 10,366,694, which is a (Continued)

(51) Int. Cl.
*G10L 19/00* (2013.01)
*G11B 27/038* (2006.01)
(Continued)

(52) U.S. Cl.
CPC ............ *G10L 19/00* (2013.01); *G11B 27/031* (2013.01); *G11B 27/038* (2013.01); *H04H 20/38* (2013.01); *H04H 60/04* (2013.01)

(58) Field of Classification Search
CPC ....... G10L 19/008; G10L 19/24; G10L 21/04; H04S 3/008
See application file for complete search history.

(56) References Cited

U.S. PATENT DOCUMENTS 5,913,190 A * 6/1999 Fielder ............. G11B 20/10527
704/229
6,278,387 B1 * 8/2001 Rayskiy ................. G10L 21/04
341/61

(Continued)

*Primary Examiner* — Daniel Abebe
(74) *Attorney, Agent, or Firm* — Kramer Levin Naftalis & Frankel LLP

(57) ABSTRACT

Systems and methods are presented for efficient cross-fading (or other multiple clip processing) of compressed domain information streams on a user or client device, such as a telephone, tablet, computer or MP3 player, or any consumer device with audio playback. Exemplary implementation systems may provide cross-fade between AAC/Enhanced AAC Plus (EAACPlus) information streams or between MP3 information streams or even between information streams of unmatched formats (e.g. AAC to MP3 or MP3 to AAC). Furthermore, these systems are distinguished by the fact that cross-fade is directly applied to the compressed bitstreams so that a single decode operation may be performed on the resulting bitstream. Moreover, using the described methods, similar cross fade in the compressed domain between information streams utilizing other formats of compression, such as, for example, MP2, AC-3, PAC, etc. can also be advantageously implemented. Thus, in exemplary embodiments of the present invention a set of frames from each input stream associated with the time interval in which a cross fade is decoded, and combined and recoded with a cross fade or other effect now in the compressed bitstream. Once sent through the client device's decoder, the user hears the transitional effect. The only input data that is decoded and processed is that associated with the portion of
(Continued)

each stream used in the crossfade, blend or other interstitial, and thus the vast majority of the input streams are left compressed.

13 Claims, 12 Drawing Sheets

Related U.S. Application Data continuation of application No. 14/395,183, filed as application No. PCT/US2013/037034 on Apr. 17, 2013, now Pat. No. 9,779,736, said application No. 14/395,183 is a continuation of application No. PCT/US2013/037013, filed on Apr. 17, 2013, said application No. 14/395,183 is a continuation-in-part of application No. 14/358,919, filed as application No. PCT/US2012/065943 on Nov. 19, 2012, now Pat. No. 9,406,303.

(60) Provisional application No. 61/687,048, filed on Apr. 17, 2012, provisional application No. 61/631,440, filed on Jan. 3, 2012, provisional application No. 61/607,532, filed on Mar. 6, 2012, provisional application No. 61/561,593, filed on Nov. 18, 2011, provisional application No. 61/687,049, filed on Apr. 17, 2012.

(51) Int. Cl.
  *H04H 60/04* (2008.01)
  *H04H 20/38* (2008.01)
  *G11B 27/031* (2006.01)

(56) References Cited

U.S. PATENT DOCUMENTS 10,115,403 B2 * 10/2018 Atti ............................ G10L 19/26
2011/0196688 A1 * 8/2011 Jones ....................... G10L 19/008
　　　　　　　　　　　　　　　　　　　　　　　　　704/503

* cited by examiner

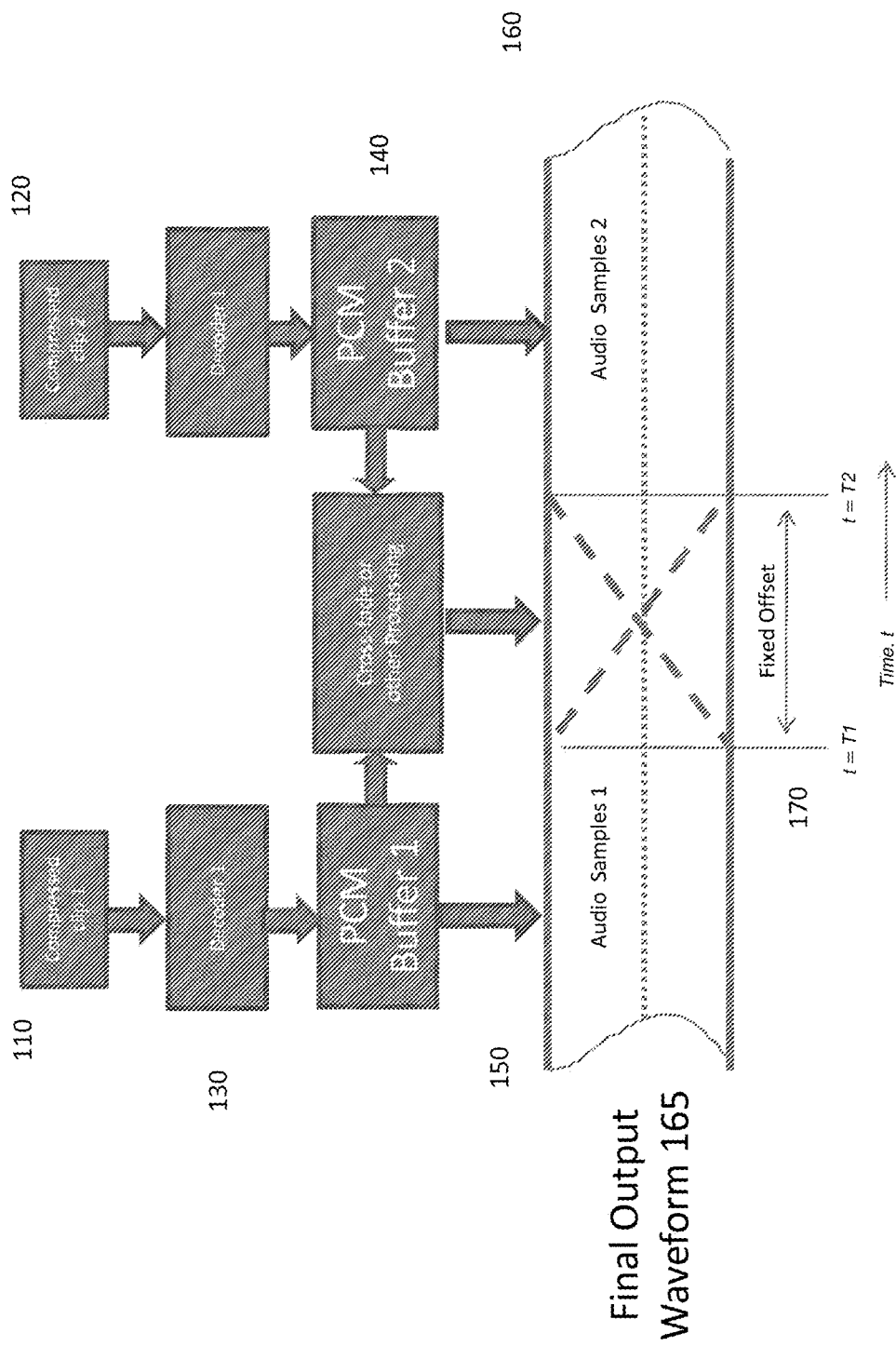
Fig. 1 - Conceptual Diagram for a *Simple* (inefficient) Cross-fade Of 2 Compressed Streams

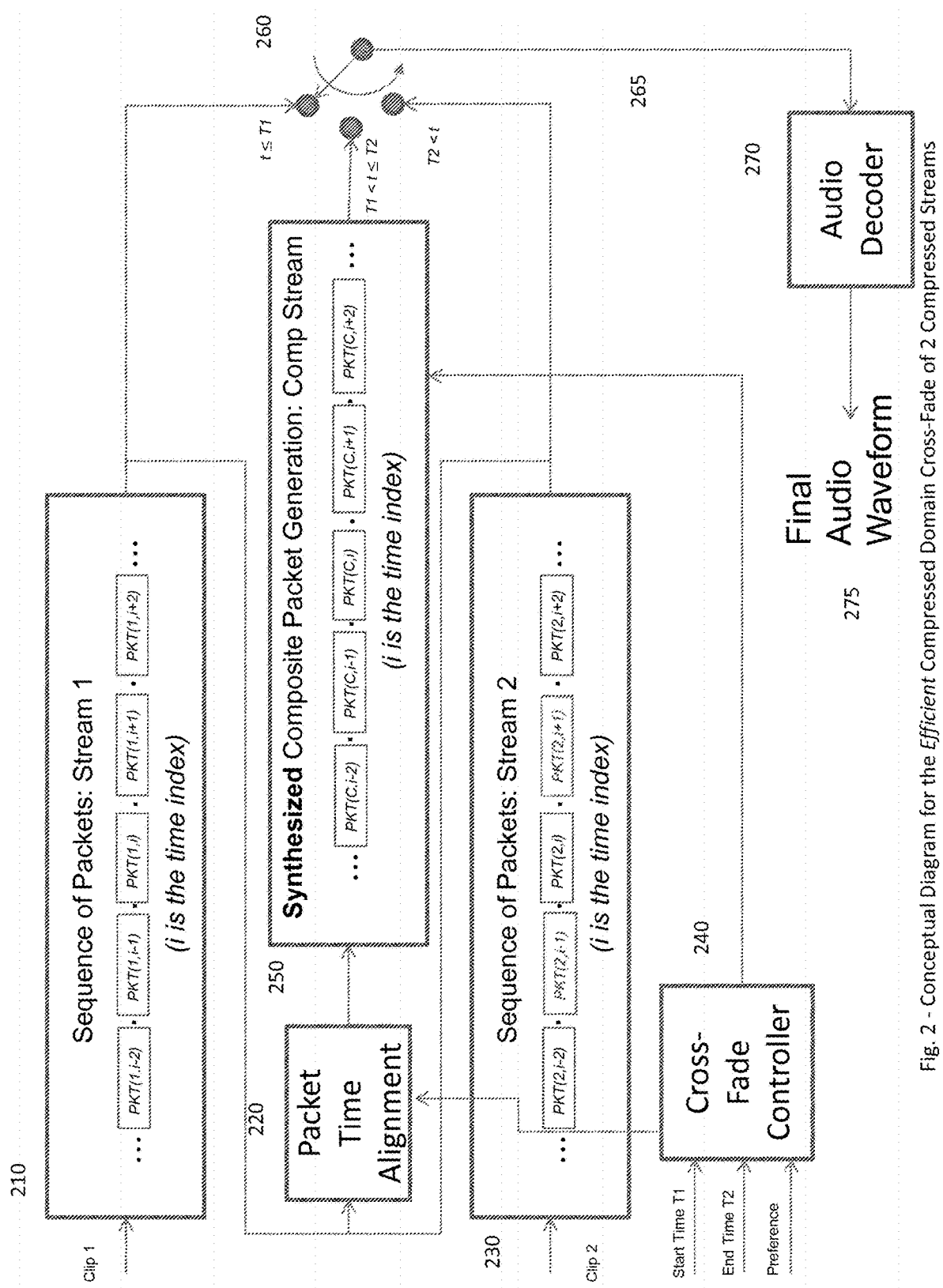
Fig. 2 - Conceptual Diagram for the *Efficient Compressed Domain Cross-Fade of 2 Compressed Streams*

| Syntax | No. of bits | Mnemonic |
|---|---|---|
| adts_fixed_header() | | |
| { | | |
| syncword; | 12 | bslbf |
| ID; | 1 | bslbf |
| layer; | 2 | uimsbf |
| protection_absent; | 1 | bslbf |
| profile; | 2 | uimsbf |
| sampling_frequency_index; | 4 | uimsbf |
| private_bit; | 1 | bslbf |
| channel_configuration; | 3 | uimsbf |
| original/copy; | 1 | bslbf |
| home; | 1 | bslbf |
| } | | |

Field used for Packet Time Alignment ← sampling_frequency_index

| Syntax | No. of bits | Mnemonic |
|---|---|---|
| adts_variable_header() | | |
| { | | |
| copyright_identification_bit; | 1 | bslbf |
| copyright_identification_start; | 1 | bslbf |
| frame_length; | 13 | bslbf |
| adts_buffer_fullness; | 11 | bslbf |
| number_of_raw_data_blocks_in_frame; | 2 | uimsfb |
| } | | |

Fig. 3 – Exemplary Codec Packet Header Information Used For Inter-stream Synchronization (AAC ADTS Header Information)

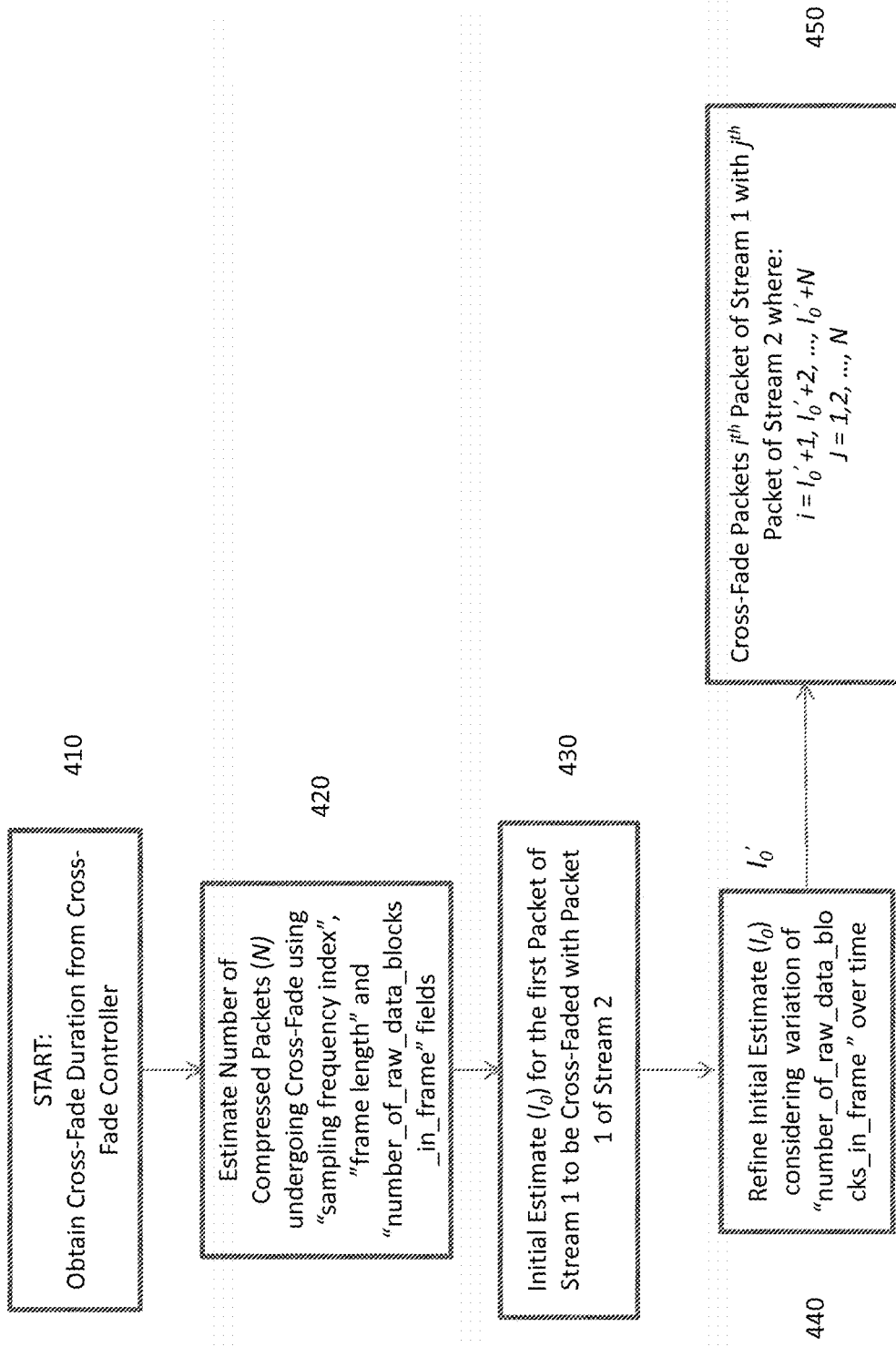
Fig 4. - Logic for Determining the Time Aligned Packet Indices For Two Streams during Cross-Fade

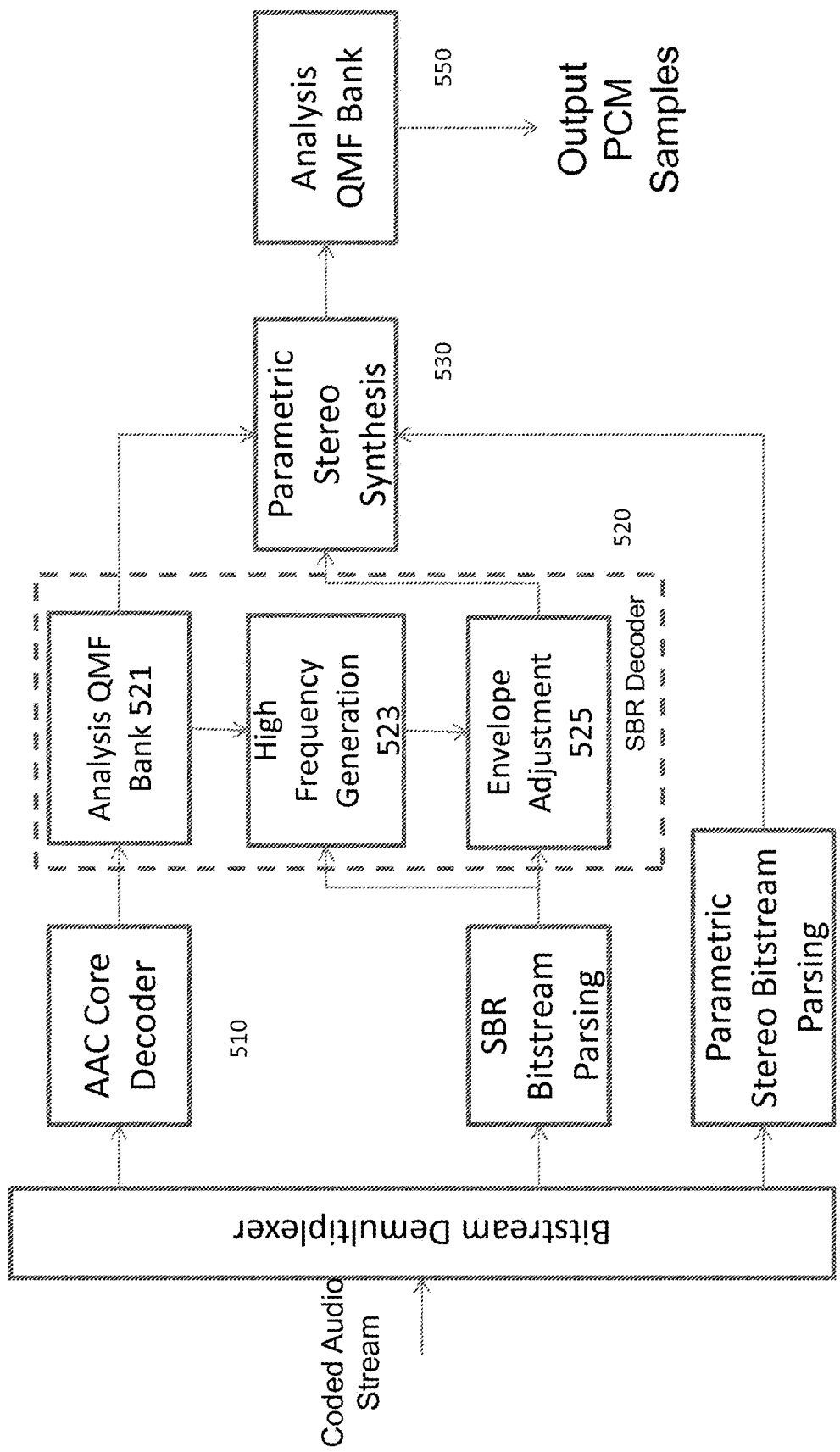
Fig. 5 – Overview of Enhanced AAC Plus Decoder

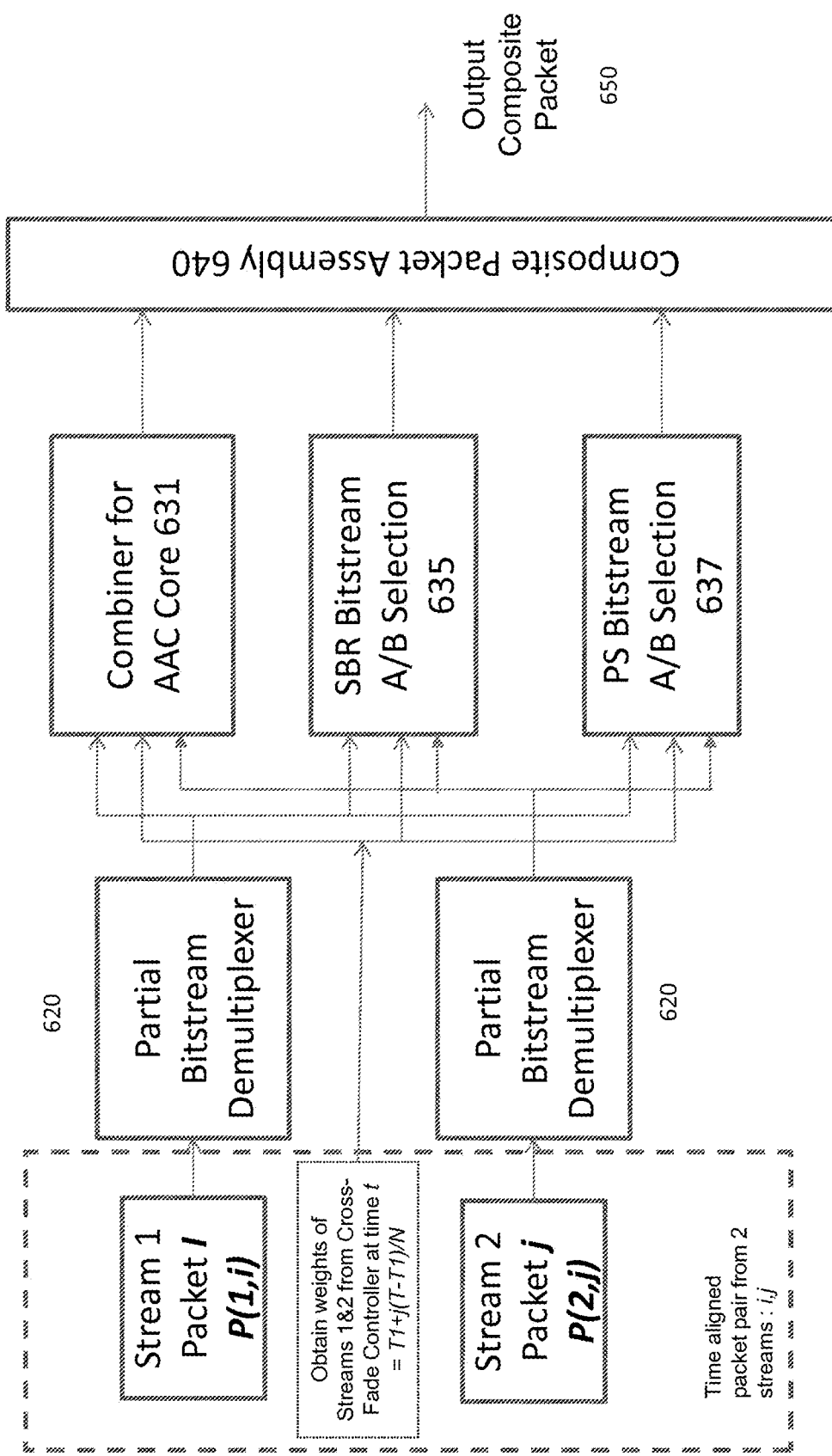
Fig. 6 – Overview of Composite Compressed Packet Synthesis Scheme for Enhanced AAC Plus Streams

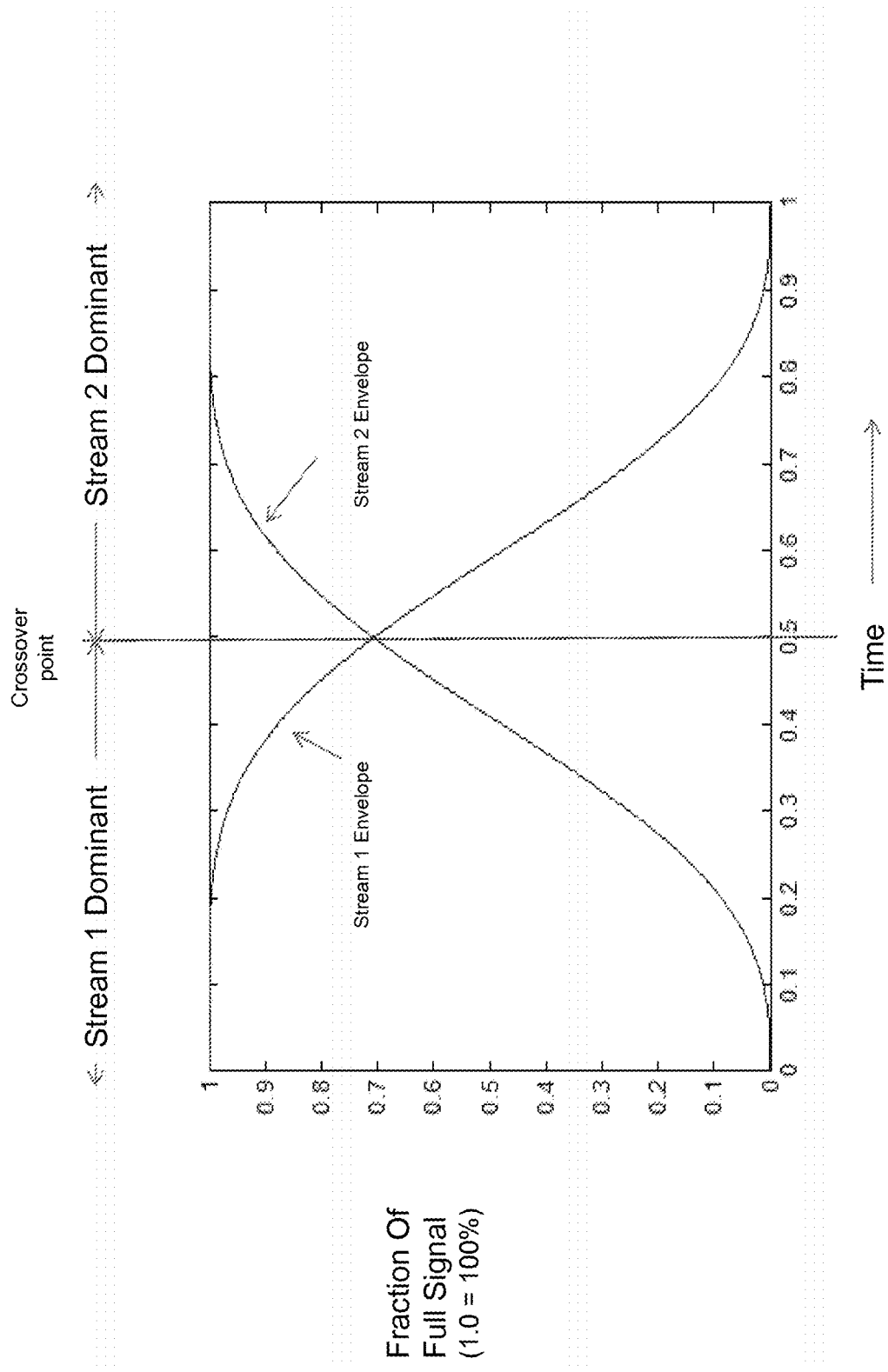
Fig. 7 – Exemplary Power-Complementary Smooth Cross-fade Window Of Order 3 Maximizing The Duration Of A Dominant Stream

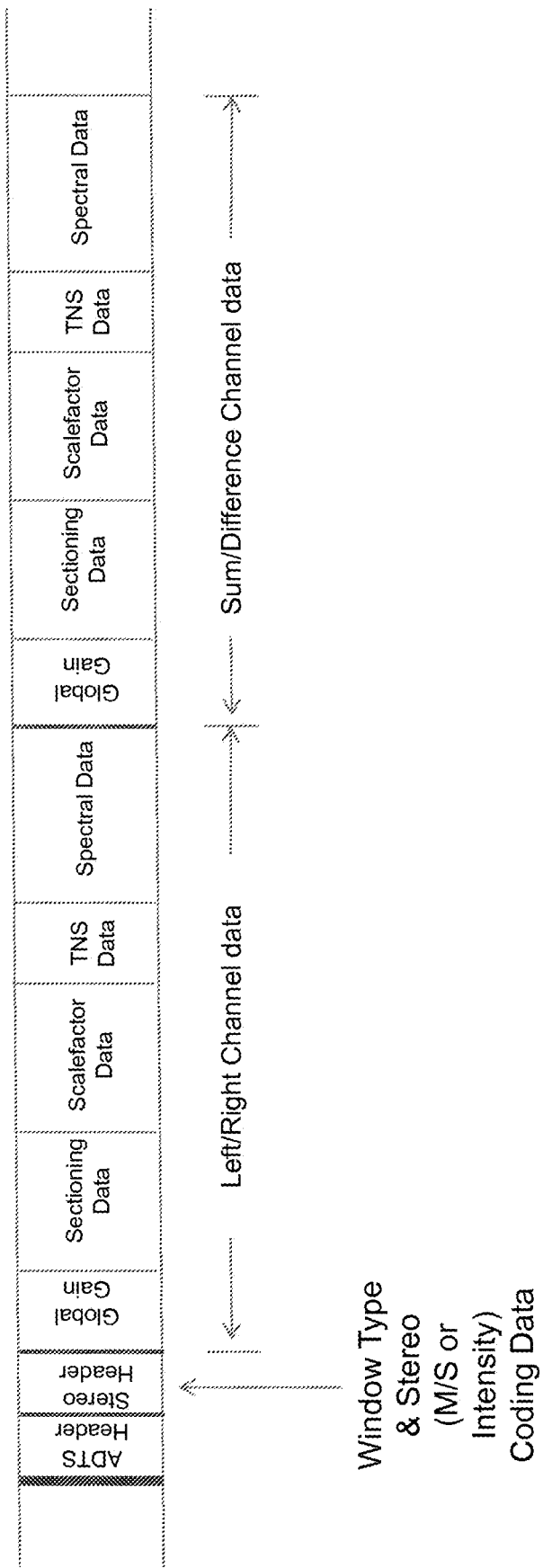
Fig. 8 – AAC Core Stereo Bitstream Packet Format

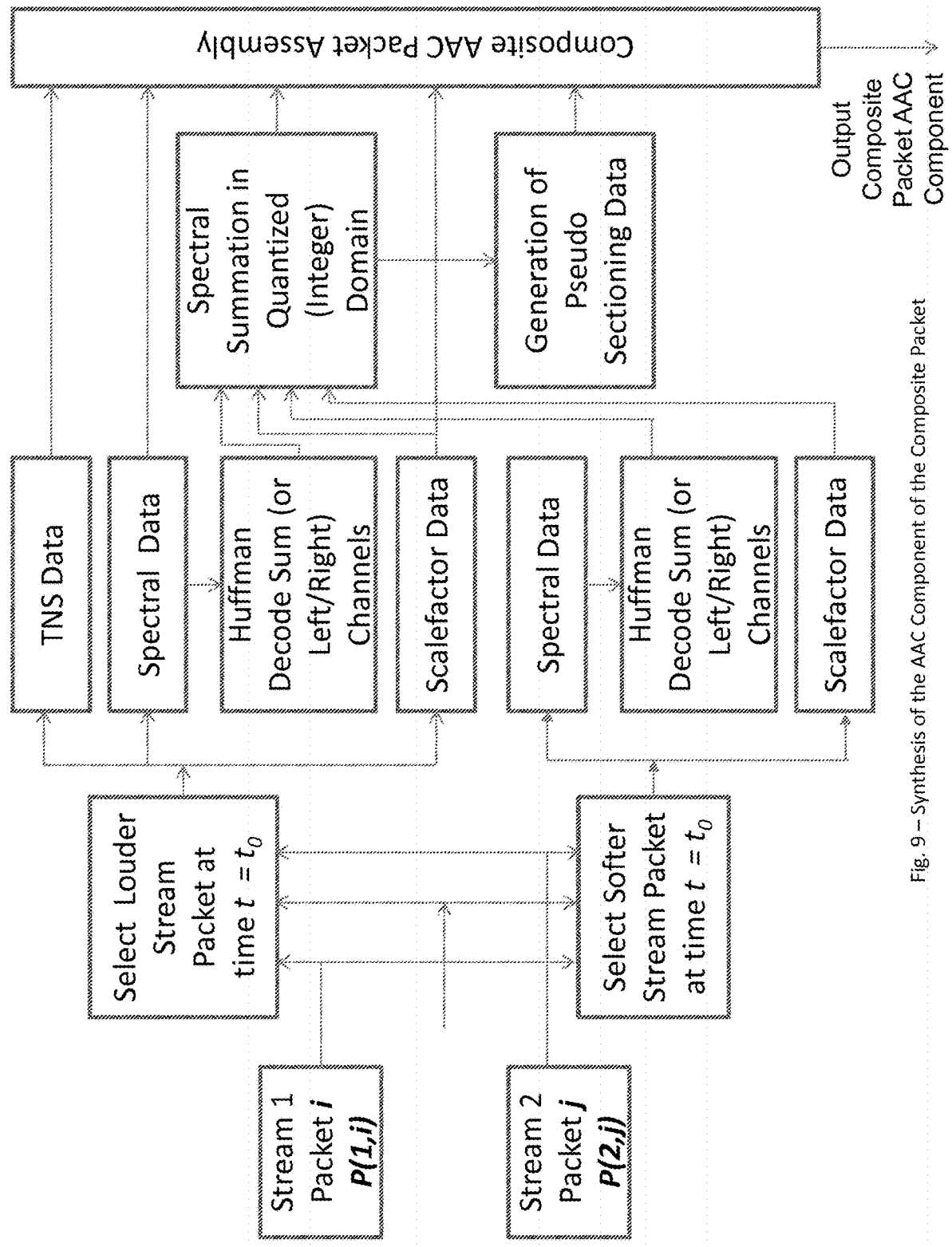
Fig. 9 – Synthesis of the AAC Component of the Composite Packet

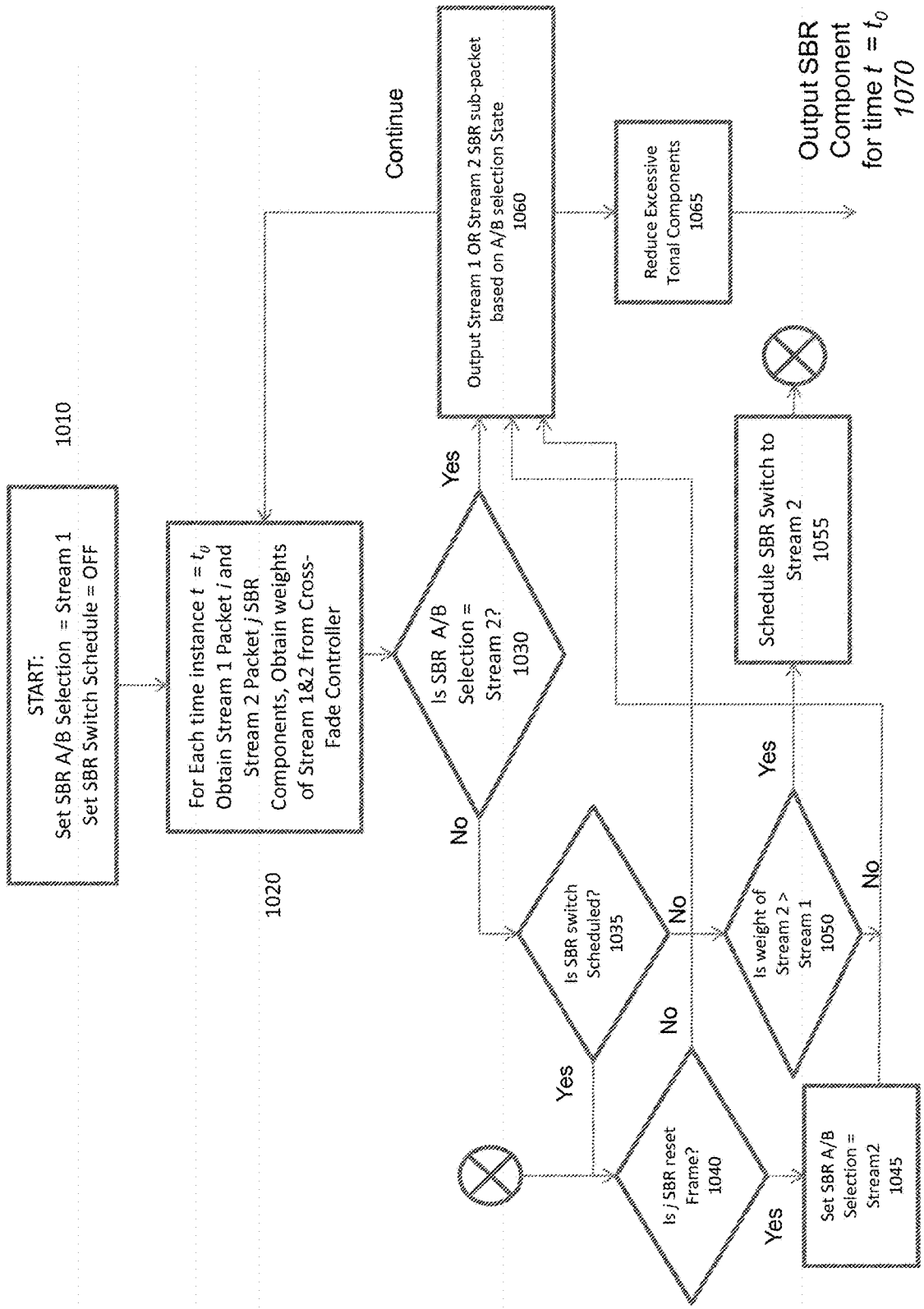
Fig. 10 - Decision Logic for the synthesis SBR component of the Composite Packet

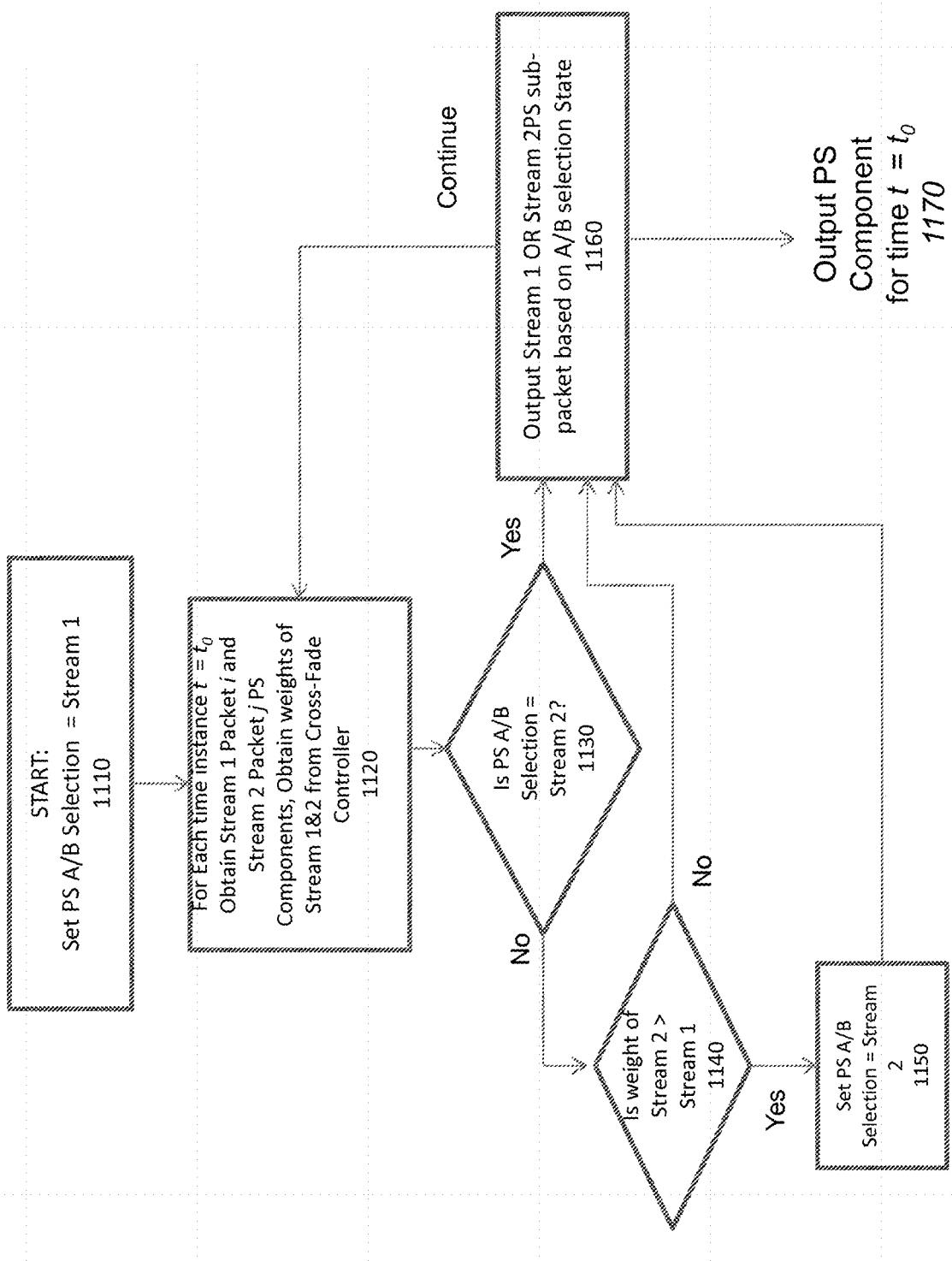
Fig. 11 - Decision Logic for the Synthesis of the PS Component of the Composite Packet

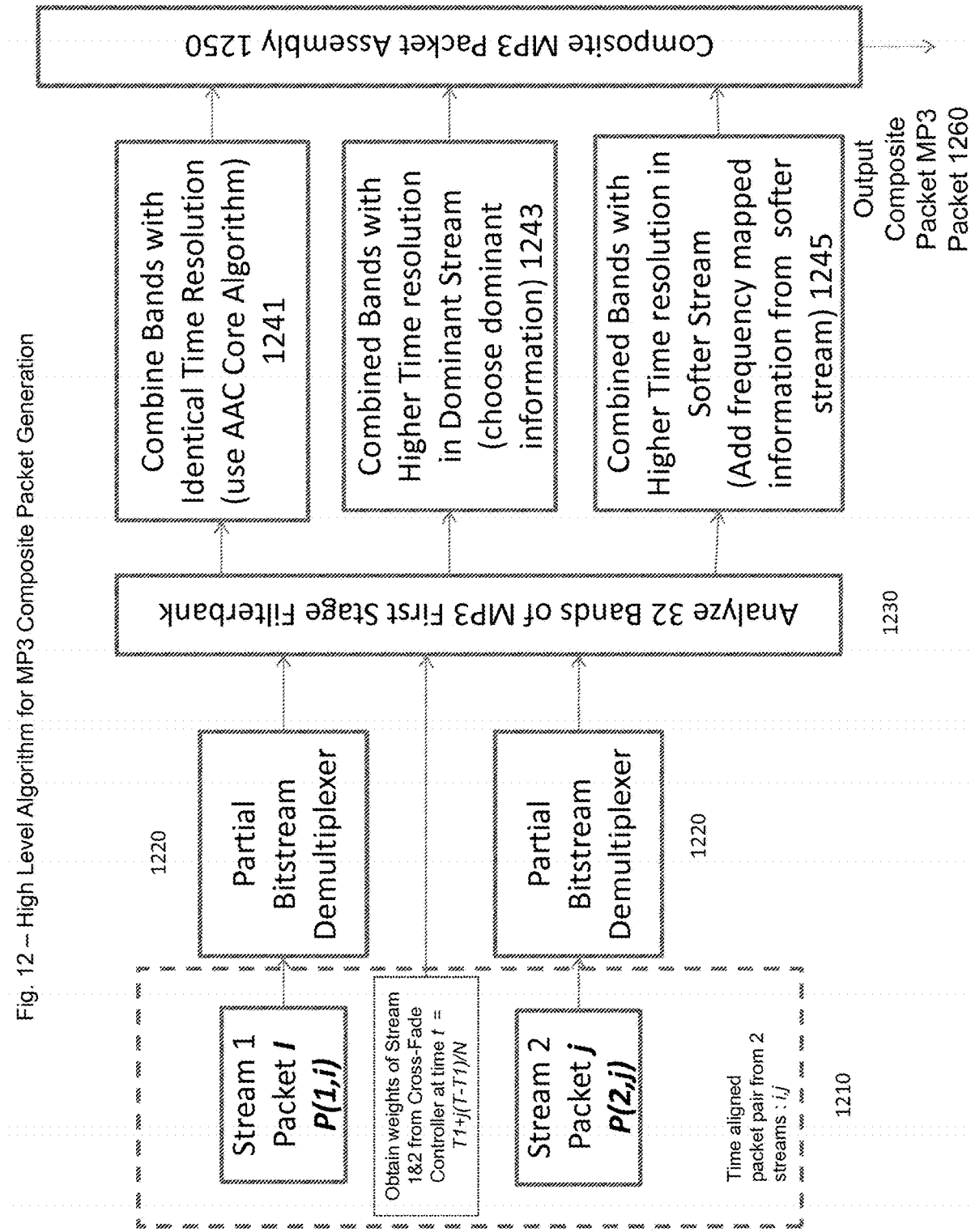

SYSTEMS AND METHODS FOR IMPLEMENTING EFFICIENT CROSS-FADING BETWEEN COMPRESSED AUDIO STREAMS

CROSS-REFERENCED TO RELATED APPLICATIONS

The present application claims priority to U.S. Provisional Patent Application Nos. 61/687,048, filed on Apr. 17, 2012 entitled SYSTEMS AND METHODS FOR IMPLEMENTING EFFICIENT CROSS-FADING BETWEEN COMPRESSED AUDIO STREAMS, and 61/687,049, filed on Apr. 17, 2012 entitled SERVER SIDE CROSSFADE FOR PROGRESSIVE DOWNLOAD MEDIA, the disclosure of each which is hereby fully incorporated herein by reference.

TECHNICAL FIELD

The present invention relates to digital media delivery and playback, and in particular to systems and methods for implementing cross-fading, interstitials and other effects/processing of two or more media elements on a downstream device so as to replicate to the extent possible the feel, sound and flow of broadcast programming or "DJ" (disc jockey) enhanced playlists.

BACKGROUND OF THE INVENTION

Media delivery has historically been a broadcast type model, where users/consumers all receive the same programming. Thus, any effects, cross-fades or other blending are performed upstream of the consuming device, prior to being sent over the broadcast channel(s). As is generally appreciated, the addition of these effects produces a high quality experience for the user, and also provides natural and enhanced transitions between program elements. These enhancements improve and enrich the listening experience, and can be changed or modified depending upon the "mood" of the sequence of songs or clips being played, as well as upon the audience type, time of day, and channel genre. Typically, elements that require cross-fading or other signal processing of two or more elements require precise synchronization and simultaneous playback of the elements to be processed. Thus, although in the 1960s and 1970s DJs would try to mix songs in real time, by "cueing up" the next song and starting its turntable a bit before the currently being played song ended, with the advent of digital media it has been the norm to perform such processing on a playlist of multiple songs or clips prior to broadcasting it, storing it at the media broadcaster's servers, and then sending it over the broadcast signal.

With the introduction of media compression and file based delivery, media is commonly downloaded directly to a user's device, such as, for example, an iPod, digital media player, MP3 player, PC, tablet, cellular phone, etc., without the benefit of upstream processing between elements. This leads to a less satisfactory user experience upon consumption or playback. A user simply hears one song stop, then hears a brief pause, then hears the next song begin. There is no "awareness" by the media playing device as to what the sequence is, no optimizations as to which song most naturally follows another, and each sequence of media clips is, in general unique to each user and how they organize their playlists.

Additionally, many consumer type devices, cell phones, etc. do not have the capability to perform simultaneous decode and presentation of media and elements so that they can be cross-faded or processed in real time. Such devices, e.g., cell phones, typically have a single hardware decoder per media type, so that any type of cross-fade in real time would also require additional software based decoding for other elements, which (i) has negative impact on battery life, and (ii) would require the precise synchronization of two or more decoders.

What is needed in the art are systems and methods to implement and facilitate cross-fading, interstitials and other effects/processing of two or more media elements on a downstream device directly in the compressed bitstream domain in a manner that solves the problems of the prior art.

What is further needed in the art are methods to perform such processing of compressed bitstreams which may be in differing compression formats.

BRIEF DESCRIPTION OF THE DRAWINGS

FIG. 1 is a conceptual diagram for a simple (inefficient) crossfade of two compressed streams;

FIG. 2 is a conceptual diagram for an exemplary efficient crossfade of two compressed streams in the compressed domain according to an exemplary embodiment of the present invention;

FIG. 3 depicts exemplary codec packet header information used for inter-stream synchronization according to an exemplary embodiment of the present invention;

FIG. 4 depicts exemplary logic for determining the time aligned packet indices for two streams during a cross-fade or other process;

FIG. 5 presents an overview of the Enhanced AAC Plus decoder;

FIG. 6 depicts an exemplary overview of a composite compressed packet synthesis scheme for Enhanced AAC Plus Streams according to an exemplary embodiment of the present invention;

FIG. 7 depicts an exemplary power-complementary smooth cross-fade window of order 3 maximizing the duration of a dominant stream, used in exemplary embodiments of the present invention;

FIG. 8 depicts an AAC Core Stereo Bitstream Packet Format;

FIG. 9 depicts synthesis of the AAC component of a composite packet according to an exemplary embodiment of the present invention;

FIG. 10 depicts exemplary decision logic for the synthesis of an SBR component of the composite packet according to an exemplary embodiment of the present invention;

FIG. 11 depicts exemplary decision logic for the synthesis of an PS component of the composite packet according to an exemplary embodiment of the present invention; and FIG. 12 depicts a high level embodiment of a scheme for the MP3 codec according to an exemplary embodiment of the present invention.

SUMMARY OF THE INVENTION

Systems and methods are presented for efficient cross-fading (or other multiple clip processing) of compressed domain information streams on a user or client device, such as, for example, a telephone or smart phone, tablet, computer or MP3 player, or any consumer device with audio playback. Exemplary implementation systems may provide cross-fade or the like between AAC/Enhanced AAC Plus ("EAACPlus") information streams or, for example, between MP3 information streams, or even between information streams of unmatched formats (e.g. AAC to MP3 or MP3 to AAC). Furthermore, these systems may be distinguished by the fact that cross-fade can be directly applied to the compressed bitstreams so that a single decode operation may be performed on the resulting bitstream. Moreover, using the methods described herein, those skilled in the art can also advantageously implement similar cross fade (or other processing/effects) between information streams utilizing other formats of compression such as, for example, MP2, AC-3, PAC, etc.

As indicated in FIG. 1, a simple, although inefficient, scheme for cross fade between two streams works by fully decoding each information stream (Compressed Clip1 and Compressed Clip2 110 and 120) to first obtain linear PCM time domain waveforms for each of the streams 140, which can then be combined, for example, using suitable time varying weighting functions to generate a final output waveform 165 for playback. This simple cross-fade scheme however can only be implemented on players where either two parallel decoding paths can be implemented or, as described in PCT Patent Application No. PCT/US2012/65943, filed on Nov. 19, 2012, entitled SYSTEMS AND METHODS FOR IMPLEMENTING CROSS-FADING, INTERSITITALS AND OTHER EFFECTS DOWNSTREAM (the "Cross-Fade Application"), under common assignment herewith, and fully incorporated herein by this reference, which describes various parameters and types of crossfades and other effects, where faster than real time decoding is available such that packets from the initial portions of the second stream may be pre-fetched and decoded. Often this may not be practical. For example, in portable players with only a single hardware decoder, the hardware decoder may not be fast enough to perform full decoding of two streams during the cross-fade window of 1 sec or more. Moreover, dual decoding, even for a limited time, generally entails a battery life penalty.

Therefore, in accordance with exemplary embodiments of the present invention, an efficient compressed domain cross-fade scheme is described. An overview of this scheme is illustrated in FIG. 2. One key exemplary method used in exemplary embodiments of the present invention to achieve efficient cross-fade between two or more information streams is to examine time aligned compressed packets from different streams, and assemble a composite compressed packet containing information derived from the two streams which can then be presented to an audio decoder during the cross-fade phase. The input to the single decoder can be provided by a multiplexer that alternatively picks up compressed packets from three possible sources, i.e. the first stream, the composite stream, and the second stream. An associated new method used in such exemplary embodiments is to achieve time alignment of the composite packets by examining header information found in typical compressed audio packets which describes their time duration as well as any packet jitter present in the stream due to, for example, variable bit rate and/or bit reservoir operation of the audio compression algorithm.

The operation of creating composite packets can, for example, be performed using a fraction of the computational complexity normally needed for the full audio decoding of the packet. Furthermore, it should be obvious to those skilled in the art that the mechanism of composite packet creation may be turned off during most of the time that the playback of a track is in progress and no cross-fade is being attempted.

DETAILED DESCRIPTION OF THE INVENTION

In exemplary embodiments of the present invention, systems and methods are provided in which cross-fading (or other processing/effects) of multiple information streams may be accomplished directly in the compressed bitstream domain at a client end, in accordance with instructions that can be provided from an upstream service. Such instructions can, for example, reflect a combination of (i) the information clips or streams, (ii) the device on which the cross-fade is to occur, and its various parameters and capabilities, and (iii) the timing information for the cross-fade operation.

In exemplary embodiments of the present invention, such systems and methods can, for example, perform such processing of compressed bitstreams even where they are in differing compression formats.

For the purposes of this disclosure, the terms "stream" and "clip" shall be used interchangeably. In exemplary embodiments of the present invention, various cross-fading algorithms can be implemented as a bitstream multiplexer that multiplexes (i) compressed packets from a first stream, (ii) output of a composite synthesized packet generator unit, and (ii) compressed packets from a second stream, to create a single stream of packets which can then, for example, be presented to an audio decoder, for example a hardware decoder, for efficient decoding and subsequent playback. Such exemplary embodiments can include a "Packet Time Alignment" unit that can, for example, identify time aligned packet pairs, each pair consisting of one packet from each of the two streams. As described below, time alignment of multiple compressed streams can be achieved by examining header information contained in the compressed packet and mapping it to the cross-fade start and end times, $t=T_1$ and $t=T_2$, respectively. The timing information can, for example, be forwarded to the Packet Time Alignment ("PTA") unit from a "Cross-Fade Controller" ("CFC") unit which can either take this information as an input from an upstream system component, or can, for example, generate it locally based on stored defaults and/or user preferences of the playback device. In the latter case, $T_1$ may, for example, be set to a time instant 1 second prior to the end of stream 1, and $T_2$ can correspond, for example, to the end of Stream 1. Thus, the compressed audio packet from Stream 1 which generates audio closest to the point in time at $\{t_{stream\ 1\ END}-1\ sec\}$ can be paired with the $1^{st}$ packet of Stream 2 by the "Packet Time Alignment" unit, and thereafter contiguous subsequent packets from the two streams can, for example, be respectively paired with each other.

In exemplary embodiments of the present invention, the packet-pairs generated by the PTA unit can be fed into a "Synthesized Packet Generation" unit along with the relative weights of the two streams at every given instance in the time window $T_1 \le t \le T_2$. The relative weights can, for example, also be generated by a "Cross-Fade Controller", once again, using either information supplied, for example, by (i) an upstream component, or (ii) generated from local user preferences, or defaults specific to a particular channel, or to a particular personalized channel and a particular user, or any combination thereof.

FIG. 2 depicts a high level system view of such an exemplary efficient compressed domain cross-fade scheme. With reference thereto, packets from Clip1 210, and Clip2 230, along with the output of the "Synthesized Composite Packet Generation" Unit 250, can be fed into packet multiplexer 260, to generate a multiplexed stream. The multiplexed stream 265 can then be fed to Audio Decoder 270, to produce a PCM Final Audio Waveform 275 for playback to a user. "Cross-Fade Controller" ("CFC") 240 accepts cross-fade timing and preference information, as noted above, either from upstream components, or from locally stored data, or, as noted, from user preferences or behavior, or any combination thereof, and can provide control information to Synthesized Composite Packet Generation Unit 250 and "Packet Time Alignment" unit ("PTA") 220, which in turn provides the above described paired-packet input to Synthesized Composite Packet Generation unit 250 and to PTA 220.

It is noted that the cross-fade timing and preference information received by CFC 240 can comprise various parameters for implementing a crossfade, including, for example, audio trajectory, fade or blend type, number of elements in the effect (e.g., 2, 3 or more, for complex voice-overs and other transitions), volume/attenuation levels for each component or element during the cross fade, intro and outro points, etc. Such parameters can, for example, be stored in CFC 240, or in some other data structure or memory location, and can be passed via messaging protocols to CFC 240, and/or can be modified/updated by inferences from user behavior on the client device and sent via a message protocol to CFC 240 on the server side. In this context reference is made to the Cross-Fade Application referenced above, which describes various parameters and types of crossfades and other effects. The Cross-Fade Application is hereby incorporated herein by this reference. Effectively any crossfade or other effect that can be performed, as described in the Cross-Fade Application can be implemented using techniques according to the present invention.

An exemplary embodiment of an efficient compressed domain cross-fade scheme is next described in detail in the context of the commonly used Enhanced AAC Plus ("EAAC Plus") compression format. EAAC Plus is a popular format for audio streaming over the Internet and mobile networks, and it provides higher quality at lower bit rates when compared to other compression formats such as, for example, MP3 or MP2. Enhanced AAC Plus is an international standard adopted by the Motion Picture Experts Group (MPEG), as ISO/IEC 14496-3:2005—Information technology—Coding of audio-visual objects—Part 3: Audio, and also the 3GPP mobile standards. EAAC Plus is itself based on a core audio coding standard ACC, ISO/IEC 13818-7:2006—Information technology—Generic coding of moving pictures and associated audio information—Part 7: Advanced Audio Coding (AAC).

It is noted, however, that exemplary embodiments of the present invention are all applicable to general audio coding principles and know-how, and as such, are readily extendible to other audio codec formats such as, for example, MP3, MP2, etc. The presentation herein using EAAC Plus being exemplary only, and not limiting in any way. Thus, also explained below are exemplary embodiments of systems implementing compressed domain cross-fades between two MP3 information streams, for example, and between, for example, a MP3 stream and a second AAC stream.

It is noted that audio compression codecs are generally inherently variable bit rate ("VBR") in nature. Thus, an information packet of a variable size can be generated for each consecutive chunk of audio covering a fixed time span. For example, an AAC codec can encode CD quality stereo audio sampled at 44,100 Hz using a frame length of 1024 stereo PCM samples. Therefore, if it is operating at 64 kbps, it will produced a variable size compressed audio packet for each consecutive 1024 input samples, whose length on average is equal to 185.76 bytes. The fixed length time window of 1024 samples is thus typically referred to as the frame length of the encoder. On the other hand, the frame length of the Enhanced AAC Plus codec is generally 2048 samples. For the purposes of transmission a variable size packet representing each frame is further encapsulated in a transport format which typically adds a variable size header to the front of each packet. For streaming applications one such encapsulation format for AAC/EAAC Plus packets is, for example, the ADTS encapsulation format, which was initially formalized in the context of MPEG2 but continues to be popular with MPEG4 AAC/EAAC Plus formats.

Next described is an illustrative embodiment of a Packet Time Alignment scheme for AAC/EAAC Plus streams using the information contained in the ADTS header. All modern audio codecs have similar information in their packet headers which can be advantageously utilized for packet time alignment of streams in these formats. FIG. 3 illustrates the fixed length and variable length fields found in an ADTS header. The following four ADTS fields can, for example, be utilized for estimating the time instance of a particular packet in exemplary embodiments of the present invention:

sampling_frequency_index;
frame_length;
adts_buffer_fullness; and
number_of_raw_data_blocks_in_frame.

These are pointed to by the arrows shown in FIG. 3 for easy identification. In exemplary embodiments of the present invention, the time instance for the $(i+1)^{th}$ EAAC Plus frame (in seconds with respect to the start of the clip) can be estimated as:

$$t(i+1) = (i*2048*\text{number\_of\_raw\_data\_blocks\_in\_frame})/\text{sampling\_frequency}$$

Because the number_of_raw_data_blocks_in_frame value may change from frame to frame, a more accurate estimate for the start time may be arrived at by, for example, keeping a cumulative estimate of the total number of raw data blocks till the $i^{th}$ frame, as follows:

$$\text{total\_number\_of\_raw\_data\_blocks\_in\_frame}_i = \sum_{k=1}^{k=i} \text{number\_of\_raw\_data\_blocks\_in\_frame}_k$$

and estimating:

$$t(i+1)' = \frac{(2048 * \text{total\_number\_of\_raw\_data\_blocks\_in\_frame}_i)}{\text{sampling\_frequency}}$$

As is illustrated in FIG. 4, the first packet in Stream 1 that is modified for the purpose of cross-fade has an index $I_0'$ 440 such that $t(I_0'-1)<T_2$ and $t(I_0'-1) \geq T_1$ where, as shown in FIG. 1, $T_1$ and $T_2$ are the beginning and ending times of a cross fade or other multi-element process. This packet can, for example, be paired with the first packet from Stream 2 for generating composite packets for cross-fade.

As shown, FIG. 4 provides exemplary logic for determining the time aligned packet indices for two streams during cross-fade. Thus, with reference to FIG. 4, at 410 process flow begins, and cross-fade duration information can be obtained from the cross-fade controller ("CFC") (240 in FIG. 2). Then, at 420, the number of compressed packets (N) undergoing cross-fade can be estimated using "sampling frequency index", "frame length" and "number_of_raw_data_blocks_in_frame" fields of the packet header, as shown in FIG. 3.

At 430 an initial estimate ($I_0$) for the first packet of Stream 1 to be cross-faded with packet 1 of Stream 2 can be made, and at 440 this estimate may be refined by considering the variation of "number_of_raw_data_blocks_in_frame" over time, to obtain revised estimate $I_0'$. Finally, at 450, cross-fading of packets can be performed by cross-fading the $i^{th}$ packet of Stream 1 with the $j^{th}$ packet of Stream 2 where: $i=I_0'+1, I_0'+2, \ldots, I_0'+N$ and $J=1, 2, \ldots, N$.

In exemplary embodiments of the present invention, in order to generate composite compressed packets using packets from two streams in the EAAC Plus format, various functional sub-components of the packets need to be analyzed and handled independently. FIG. 5 shows an overview of the EAAC Plus decoder. As can be seen with reference thereto, the decoder consists of 3 main functional blocks: AAC Core Decoder 510, SBR Decoder 520, and Parametric Stereo Synthesis 530. The core AAC decoder component 510 of the codec may encode the detailed spectral information in the frequency domain using a Modified Discrete Cosine Transform (MDCT), for example. The spectral information can be quantized by the encoder using a Psychoacoustic Model (PM), and the utilized quantization levels derived from the PM can also be made available to the decoder. The second block, SBR Decoder 520 can involve a bandwidth extension technique used to generate high frequency components in the signal efficiently, by using the low-frequency baseband information and a small amount of side information.

Thus, SBR decoder 520 operates by first analyzing the time domain signal generated by core AAC decoder 510 using (i) an oversampled QMF filterbank 521. Next (ii) frequency mapping operations 523 such as, for example, copying from lower bands to the higher bands can be applied, followed by (iii) time-frequency envelope adjustment 525, using information from the SBR bitstream. A final QMF synthesis 550 can also be considered as part of the SBR decoder, although it may be applied subsequent to the Parametric Stereo decoding 530 (described below). When SBR is in use (e.g., at bit rates of 64 kbps or lower), the core AAC portion of the codec can advantageously encode only the lower half of the frequency spectrum or less, since the higher frequencies are more efficiently encoded using the SBR technique. In fact, in exemplary embodiments of the present invention, 2048 stereo samples in a frame can be low pass filtered and down-sampled to generate 1024 stereo samples which can then, for example, be coded using the core AAC block. The third major functional tool in EAACPlus, called Parametric Stereo (PS) coding 530, is generally used at bit rates below 32 kbps, and is a technique for efficient parametric coding of the stereo information. Thus, a system implementing cross-fade in the compressed domain for an EAACPlus stream can, for example, include methods for combining (for each packet pair) (i) core AAC components, (ii) SBR components, and (iii) PS components.

An exemplary preferred embodiment of a composite compressed packet generation scheme for the EAAC Plus algorithm is shown in FIG. 6. The exemplary implementation is based on a relatively well known audio perception principle that during cross-fade overall quality is driven primarily by the dominant signal at any given time. Therefore, in exemplary embodiments of the present invention, all efforts can be made to preserve the quality of the dominant sound during composite packet generation. The main role of the lower level (softer) signal can thus create an impression for the listener that a secondary signal that is either being faded out or faded in is also present. Therefore, only certain important components from the lower level signal can be selected and injected into an exemplary composite packet. This serves the dual purpose of keeping the overall audio quality high while at the same time keeping the complexity low.

Another important consideration in maintaining audio quality during a cross-fade is the shape of the Fade In and Fad Out functions. Various shapes for the cross-fade functions such as linear, logarithmic, or raised-cosine have been employed in the past. In exemplary embodiments of the present invention a pair of power-complementary cross-fade windows with high level of time localization can be used. This so called order 3 power-complementary window, shown in FIG. 7 for example, has good frequency selectivity while at the same time being more concentrated towards the ends in comparison to other popular cross-fade functions. The specific shape of a given order 3 power-complementary window ensures that the fraction of the time during a cross-fade for which the first or the second stream signal is dominating (in perceived loudness) is higher. A can be seen in FIG. 7, there is effectively always a dominant signal except at the crossover point. Thus, as shown in FIG. 6, at 610 the exemplary embodiment of the composite EAACPlus packet creation mechanism can receive a sequence of paired packets for the two streams from the Packet Time Alignment ("PTA") unit, and the relative weights of the two streams at any given time from the Cross-Fade Controller. The CFC then can, for example, use an order 3 power-complementary transition window shape, as shown, for example, in FIG. 7, in generating these weights.

Continuing with reference to FIG. 6, in exemplary embodiments of the present invention packet pairs P(1,i) and P(2,j) can, for example, as shown at 620, both be partially demultiplexed to identify three subcomponents, i.e., the (i) AAC Core, (ii) SBR, and (iii) PS components of each of these, and the respective subcomponents can then, for example, be combined to generate the composite subcomponents as shown at 631, 635 and 637, respectively. In exemplary embodiments of the present invention, different combination strategies can be used for the three subcomponents. Thus, for the SBR and PS subcomponents, basically an A/B decision can be made favoring the dominating stream at any given instance, while for the AAC Core subcomponent, a more complex combination algorithm can, for example, be employed as shown at 631. Finally, for example, the composite subcomponent packets can be combined at 640 to produce a full composite bitstream packet 650. Thus, in exemplary embodiments of the present invention a set of frames can be obtained from each input stream associated with the time interval in which a cross fade is decoded, and combined and re-encoded with a cross fade or other effect now in the compressed bitstream. Once sent through a client device's decoder, the user can hear the transitional effect. The only input data that is decoded and processed need be that associated with the portion of each stream used in the crossfade, blend or other interstitial, and thus the vast majority of the input streams may be left compressed, thus saving decompression processing for only those portions of the signal where it is actually needed.

Next described is an exemplary combination method for each of the subcomponents in detail.

Focusing on the AAC Core combination first, it is useful to take a closer look at the structure of the AAC Core bitstream packet format, as shown in FIG. 8. With reference thereto, the AAC Core packet contains (in addition to header information) stereo coding followed by, for each of the two audio channels, a global gain, sectioning data, scalefactor data, TNS data, and finally, Huffman coded spectral information. In AAC coding the two audio channels Left and Right are typically coded in the frequency domain in so called scalefactor bands, which represent a grouping of 1024 frequency lines in up to 36 bands. For each scalefactor band a stereo coding decision can be made to decide if the information is transmitted as Left/Right or Sum/Difference (a process called "matrixing") and these matrixed channels can then, for example, be quantized using scalefactor derived quantizer step sizes. The quantized coefficients can then be entropy coded using, for example, Huffman coding which uses an adaptive codebook. The codebook selection is adaptive for each "section" spanning one or more scalefactor bands, and the boundaries of sections are themselves adaptive and indicated by the sectioning information in the bitstream. Thus, a composite packet generation scheme for the AAC core needs to combine all these information components, as next described.

Core Concepts Used in Exemplary Implementation/AAC Core Composite Packet Generation Next described in general, and with reference to FIG. 9, are various core functionalities and concepts that can be used in an example implementation of an AAC Core combination according to exemplary embodiments of the present invention. The main guiding principle, as noted above, in this exemplary implementation, is an attempt to preserve the quality of the dominant stream while including a listener recognizable signature of the non-dominant stream into the combined packets so that the listener tangibly hears that one clip is fading out and that a second clip is fading in. Exemplary methods for generating various components of the combined AAC packet are summarized below:

(a) stereo coding information is preserved from the dominant channel such that for any scalefactor band that the dominant channel uses Sum/Diff coding, the composite packet also has Sum/Diff coding, and any scalefactor band for which the dominant channel has Right/Left coding, the composite packet also has Right/Left coding;

(b) Global gain for both the channels is taken from the dominant channel;

(c) Sectioning information flattened for both channels; replace the sectioning information by an idealized sectioning information in which each scalefactor band is in a section of its own and the codebook selection is changed to a so called Escape codebook which is capable of encoding any integer value; this allows maximum flexibility in terms of combining the quantized coefficients from the two channels. It is noted that this process of flattening the sectioning information can inflate the size of the packet, but since the packets are already on the decoder/player (client device) a temporary change in bit rates is not seen as a serious issue;

(d) scalefactors can be taken directly from the dominant stream for both channels; and (e) quantized spectral coefficients can be combined as shown in Table 1 provided below. Four combinations are possible depending upon the Sum/Diff coding mode of the dominant and non-dominant channels respectively:

TABLE 1

| Case | Coding Description | Combination Strategy |
|---|---|---|
| 1 | Dominant has Sum/Diff and non-dominant also has Sum/Diff | Modify Sum of dominant using Sum of non-dominant |
| 2 | Dominant has Sum/Diff and non-dominant has Right/Left | Do a rough estimate to see if Right or Left of non-dominant has higher energy and use that to modify Sum of dominant |
| 3 | Dominant has Right/Left and non-dominant also has Right/Left | Use the corresponding Right or Left of non-dominant to modify Right or Left of Dominant |
| 4 | Dominant has Right/Left and non-dominant has Sum/Diff | Use Sum from non-dominant to modify Right and Left of dominant. |

In exemplary embodiments of the present invention, once an identification of the modifying and modified spectral components from respectively the non-dominant and dominant streams, respectively, has been made, a modified quantized spectral coefficient can be efficiently estimated as follows:

$$X_2^{requant}(k) = |X_2(k)| \left[ sign(X_2(k)) + sign(X_1(k)) \left( \frac{|X_1(k)|}{|X_2(k)|} \right)^{\frac{4}{3}} \right]^{\frac{3}{4}} 2^{-\frac{1}{4}(scf1-scf2-glbgain1+glbgin2)}$$

where the above equation is derived from the shape of the AAC quantizers. Those skilled in the art will readily recognize that in exemplary embodiments the arithmetic may be efficiently implemented using lookup tables.

Exemplary Decision Logic for SBR Subcomponent Synthesis

FIG. 10 shows an exemplary decision algorithm for the selection of SBR information from the two packets for use in a composite packet. As described above, SBR information can be taken directly from the dominant stream, and as such, does not need to be combined. However the situation is somewhat complicated by the fact that SBR may use inter-frame coding and it may not be possible to switch an SBR component from Stream 1 to Stream 2 at any random frame. Therefore, once for any given packet a decision has been taken to start using SBR information from Stream 2, for example, the actual process of using SBR components from Stream 2 must wait till a SBR reset frame is encountered. In a typical EAAC Plus stream the frequency of SBR reset may range from 1-10 frames. Details of an exemplary SBR switch algorithm which takes the SBR reset into account are thus shown in FIG. 10.

With reference thereto, the following processing can occur. Beginning at 1010, set SBR NB Selection=Stream 1, and set SBR Switch Schedule=OFF. Then at 1020, for each time instance t=t$_0$, Obtain Stream 1 Packet i and Stream 2 Packet j SBR Components, and obtain weights of Streams 1&2 from Cross-Fade Controller ("CFC"). Next, at 1030, query if SBR NB Selection=Stream 2.

If yes, process flow moves to 1060, and processing can output Stream 1 OR Stream 2 SBR sub-packet based on A/B selection state. From there, at 1065 excessive tonal components can be reduced, and at 1070, processing can output SBR Component for time t=t$_0$. Then from 1060, process flow returns to 1020, for the next instance.

On the other hand, if at 1030 the answer is no, then at 1035 it can be queried if SBR switch is scheduled. If yes, at

1040, it can be further queried if j SBR is a reset frame. If yes, and it is a reset frame, then, for example, at 1045 the SBR NB Selection can be set as =Stream2, and process flow can continue to 1060, as described above.

If, on the other hand, at 1035 the answer is no, and SBR switch is NOT scheduled, then at 1050 it can be further queried if the weight of Stream 2>Stream 1. If yes, at 1055, SBR Switch can be scheduled to be Stream 2, and processing can end. If no at 1050, then processing continues to 1060, as described above.

Exemplary Decision Tree for PS Subcomponent Synthesis

FIG. 11 depicts exemplary decision logic for synthesizing the PS information. Unlike the SBR components, where, as noted above, care must be taken related to SBR reset, PS information can, for example, be directly obtained from the dominant component. With reference thereto, the following processing can occur. Beginning at 1110 processing can set PS NB Selection to =Stream 1. Then, at 1120, for example, for each time instance t=$t_0$, processing can obtain Stream 1 Packet i and Stream 2 Packet j PS components, and obtain the weights of Streams 1&2 from the Cross-Fade Controller, as above. From there, at 1130, processing can query if PS A/B selection is equal to Steam 2. If yes, at 1160, processing can output Stream 1 or Stream 2 PS sub-packet based on the NB selection state, and at 1170 processing can, for example, output PS component for time t=$t_0$. If, on the other hand, the answer at 1130 is no, then a further query can be made at 1140, namely, is the weight of Stream 2>the weight of Stream 1. If yes, then flow can move to 1150, and the PS NB selection can be set to Stream 2. Then process flow can continue to 1160, as shown, and also to 1120, for the next instance. If no at 1140, then process flow can, for example, continue directly to 1160, and processing may output Stream 1 or Stream 2 PS sub-packet based on NB selection state, as above. From 1160 process flow moves to 1170, as above, and also to 1120, for the next instance.

In exemplary embodiments of the present invention, using combination techniques as described above in the context of EAAC Plus algorithms, it is similarly possible to effect a compressed domain cross fade between two MP3 streams, for example, or a mix of different type of codec outputs, such as, for example, one stream being in EAAC Plus and another one in MP3 format.

Server Side Implementation

In exemplary embodiments of the present invention a compressed domain cross-fade scheme as described above can also be advantageously implemented on the server side in a music or other content delivery/distribution system. In such case a final cross-faded stream combining compressed packets from Stream 1, composite packets associated with the time duration of the cross fade, and Stream 2 packets are sent to the receiver as a single stream for decode and playback. Such server side cross fade scheme may use algorithms as described above, e.g. when the EAAC Plus algorithm is in use, or may take a somewhat modified approach because when the compressed domain cross-fade is implemented at the server side it may be less important to minimize the complexity of the partial decode (since a server in general has more processing resources than a decoder implemented in a portable player), but rather a more important consideration may be to minimize any potential loss in audio quality that may result from fully decoding the two streams and then re-encoding a stream combined in the PCM domain. Such losses in audio quality resulting from multiple encode/decodes using low bit rate codecs like EAAC Plus are well known in the field and are commonly referred to as the tandem coding losses. Another objective in server side cross-fade scheme may be to preserve the bit rate of combined stream since it still needs to be transmitted to the player using potentially bandwidth limited channels. Thus, a server side compressed domain cross-fade scheme may therefore incorporate the following changes to, and variations on, the above described client side algorithm:

Sectioning information for the combined scheme need not be flattened as described above, but rather the sectioning algorithm inherent in the EAAC Plus codec can be invoked once again to find the optimum section boundaries and the codebook selection for the final combined quantized scheme.

The process of re-quantization can, for example, be implemented as an iterative scheme that maximizes quality while maintaining the rate constraint. This involves the following iteration for each scalefactor band:

(1) fully inverse quantizing the spectral coefficients from the two streams and the adding the resulting real values;

(2) estimating the total quantization noise power for the two streams in the scalefactor band using a model for the non-linear quantizer used in EAAC Plus;

(3) iteratively finding a new scalefactor for the scalefactor band such that the resulting quantization noise for the combined (summed) spectral coefficients will be less than the total quantization noise power estimates; and (4) estimating the overall bit demand for all the scalefactor bands and if it is found to be outside the acceptable bands adjusting the quantization noise power targets and repeating (3) for once again for all the bands in which these targets have been modified.

Compressed Domain Crossfade with Other Codecs or Mixed Codec Streams

In exemplary embodiments of the present invention, using the various combination principles as described above in the context of EAAC Plus algorithms, it is also possible to affect a compressed domain cross fade between two MP3 streams, for example, or between streams encoded using different types of codecs such as, for example, one stream being in EAAC Plus and another one (or more) being in the MP3 format.

Accordingly, FIG. 12 shows a high level embodiment of an exemplary scheme for the MP3 codec. Because MP3 uses a multi-stage filterbank with a first stage of 32 frequency band split following by adaptive subsequent split for each of the 32 bands with variable time resolution, the scheme needs to work according the chosen time-frequency resolution in each of the 32 bands for the two streams. At a high level the scheme works as follows: initially a time aligned pair and weights of streams 1 and 2 can be obtained, as described above with reference to FIG. 6, at 1210; then, at 1220 packet pairs P(1,i) and P(2,j) can, for example, both be partially demultiplexed; next at 1230 the 32 bands of the MP3 first stage filterbank can be analyzed, resulting in three possible outcomes: (i) In any of the 32 bands, if both the streams are found to have identical time-frequency resolution then a scheme that is qualitatively identical to the AAC Core combination algorithm can be directly applied, as at 1241; (ii) In a band where the dominant scheme is using higher time resolution, the information from the dominant scheme is chosen and the information from the softer stream packet is discarded as at 1243; and (iii) In a band where the softer scheme (in terms of signal strength) has higher time resolution, a mapped (averaged) information derived from the softer stream is added to the dominant scheme information to generate the composite information, as at 1245. Finally, from 1241, 1243 and 1245, as the case may be, processing continues to 1250 where the composite MP3 packet can be assembled, and from there such MP3 composite packet can be output, as shown at 1260.

Exemplary Implementations

Any suitable programming language can be used to implement the routines of particular exemplary embodiments including, but not limited to, the following: C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for implementing efficient cross-fading between compressed audio streams, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation The above-presented description and accompanying figures are intended by way of example only and are not intended to limit the present invention in any way except as set forth in the following claims. It is particularly noted that persons skilled in the art can readily combine the various technical aspects of the various exemplary embodiments described into a wide variety of techniques, systems and methods, all being encompassed within the present invention. For the sake of clarity, it is noted that the term "crossfade" includes any transition, blend or interstitial effect implemented on or near a boundary between two successive content clips or files provided in a content delivery service or method.

What is claimed:

1. A non-transitory computer readable medium containing instructions that, when executed by at least processor of a computing device, cause the computing device to:
   time align compressed packets of a first audio stream with compressed packets of a second audio stream;
   decompose data in each time aligned compressed packet of the first audio stream and the second audio stream into subcomponents;
   derive composited compressed packets by combining each subcomponent of each time aligned compressed packet of the first audio stream with the a corresponding subcomponent of a time aligned compressed packet of the second audio stream; and
   decoding the composite compressed packets during a cross-fade between the first audio stream and the second audio stream.

2. The non-transitory computer readable medium of claim 1, wherein the computing device further presents the composite compressed packets to an audio decoder.

3. The non-transitory computer readable medium of claim 2, wherein the presenting the composite compressed packets to the audio decoder includes multiplexing the first audio stream, the second audio stream, and the derived composite compressed packets according to a time index.

4. The non-transitory computer readable medium of claim 1, wherein at least one of the first audio stream and the second audio stream is encoded in AAC format.

5. The non-transitory computer readable medium of claim 1, wherein at least one of the first audio stream and the second audio stream is encoded in EAAC Plus format.

6. The non-transitory computer readable medium of claim 1, wherein at least one of the first audio stream and the second audio stream is encoded in MP3 format.

7. The non-transitory computer readable medium of claim 1, wherein the subcomponents include at least one AAC Core component.

8. The non-transitory computer readable medium of claim 1, wherein the subcomponents include at least one Spectral Band Replication ("SBR") component.

9. The non-transitory computer readable medium of claim 1, wherein the subcomponents include at least one Parametric Stereo ("PS") component.

10. The non-transitory computer readable medium of claim 1, wherein the time aligning is performed using data included in a header of at least one of the first audio stream and the second audio stream.

11. The non-transitory computer readable medium of claim 1, wherein the decomposing includes at least partially demultiplexing the data into the subcomponents of the data.

12. The non-transitory computer readable medium of claim 1, wherein the time aligning includes identifying a first frame from at least one of the first audio stream and the second audio stream based at least in part on a sampling frequency.

13. The non-transitory computer readable medium of claim 1, wherein the time aligning includes identifying a first frame from at least one of the first audio stream and the second audio stream based at least in part on a number of raw data blocks per frame in the at least one of the first audio stream and the second audio stream.

* * * * *